United States Patent
Chaudhuri et al.

(10) Patent No.: US 6,947,927 B2
(45) Date of Patent: Sep. 20, 2005

(54) METHOD AND APPARATUS FOR EXPLOITING STATISTICS ON QUERY EXPRESSIONS FOR OPTIMIZATION

(75) Inventors: Surajit Chaudhuri, Redmond, WA (US); Nicolas Bruno, New York, NY (US)

(73) Assignee: Microsoft Corporation, Redmond, VA (US)

(*) Notice: Subject to any disclaimer, the term of this patent is extended or adjusted under 35 U.S.C. 154(b) by 437 days.

(21) Appl. No.: 10/191,822

(22) Filed: Jul. 9, 2002

(65) Prior Publication Data

US 2004/0010488 A1 Jan. 15, 2004

(51) Int. Cl.⁷ ............................................. G06F 17/30
(52) U.S. Cl. .................... 707/3; 707/102; 707/104.1; 707/100; 707/103
(58) Field of Search .............................. 707/1, 2, 3, 5, 707/100, 102, 104.1

(56) References Cited

U.S. PATENT DOCUMENTS

| | | | |
|---|---|---|---|
| 6,393,419 B1 * | 5/2002 | Novak et al. .................. | 707/8 |
| 6,529,901 B1 * | 3/2003 | Chaudhuri et al. ............ | 707/3 |
| 6,618,719 B1 * | 9/2003 | Andrei .......................... | 707/2 |
| 6,732,110 B2 * | 5/2004 | Rjaibi et al. ................. | 707/101 |
| 6,754,652 B2 * | 6/2004 | Bestgen et al. ............... | 707/3 |
| 2003/0208484 A1 * | 11/2003 | Chang et al. ................. | 707/5 |

OTHER PUBLICATIONS

A. Aboulnaga and S. Chaudhuri, "Self–tuning Histograms: Building Histograms without Looking at Data", In Proceedings of the 1999 ACM International Conference on Management of Data (SIGMOD '99), Jun. 1999, pp. 181–192.

S. Acharya, P.B. Gibbons, V. Poosala and S. Ramaswamy, "Join Synopses for Approximate Query Answering", In Proceedings of the 1999 ACM International Conference on Management of Data (SIGMOD '99), 1999, pp. 275–286.

N. Bruno, S. Chaudhuri and L. Gravano, "STHoles: A Multidimensional Workload–Aware Histogram", In Proceedings of the 2001 ACM International Conference on Management of Data (SIGMOD '01), 2001, pp. 211–222.

S. Chaudhuri, "An Overview of Query Optimization in Relational Systems", In Proceedings of the Seventeenth ACM SIGACT–SIGMOD–SIGART Symposium on Principles of Database Systems, ACM Press, 1998, pp. 34–43.

(Continued)

*Primary Examiner*—Alford Kindred
*Assistant Examiner*—Sana Al-Hashemi
(74) *Attorney, Agent, or Firm*—Microsoft Corp.

(57) ABSTRACT

A method for evaluating a user query on a relational database having records stored therein, a workload made up of a set of queries that have been executed on the database, and a query optimizer that generates a query execution plan for the user query. Each query plan includes a plurality of intermediate query plan components that verify a subset of records from the database meeting query criteria. The method accesses the query plan and a set of stored intermediate statistics for records verified by query components, such as histograms that summarize the cardinality of the records that verify the query component. The method forms a transformed query plan based on the selected intermediate statistics (possibly by rewriting the query plan) and estimates the cardinality of the transformed query plan to arrive at a more accurate cardinality estimate for the query. If additional intermediate statistics are necessary, a pool of intermediate statistics may be generated based on the queries in the workload by evaluating the benefit of a given statistic over the workload and adding intermediate statistics to the pool that provide relatively great benefit.

23 Claims, 8 Drawing Sheets

OTHER PUBLICATIONS

S. Chaudhuri, R. Krishnamurthy, S. Potamianos and K. Shim, "Optimizing Queries with Materialized Views", In Proceedings of the Eleventh International Conference on Data Engineering, 1995, pp. 190–200.

S. Chaudhuri and V. Narasayya, "Automating Statistics Management for Query Optimizers", In Proceedings of the Sixteenth International Conference on Data Engineering, 2000, 10 pages.

S. Chaudhuri and V. Narasayya, "An Efficient Cost–Driven Index Selection Tool for Microsoft SQL Server", In Proceedings of the Twenty–third International Conference on Very Large Databases (VLDB'97), Aug. 1997, pp. 146–155.

S. Chaudhuri and V. Narasayya, "AutoAdmin "What–If" Index Analysis Utility", In SIGMOD 1998, Proceedings ACM SIGMOD International Conference on Management of Data, 1998, 12 pages.

J. Goldstein and P.–A. Larson, "Optimizing Queries Using Materialized Views: A Practical, Scalable Solution", In Proceedings of the 2001 ACM International Conference on Management of Data (SIGMOD '01), 2001, pp. 331–342.

G. Graefe, "The Cascades Framework for Query Optimization", Data Engineering Bulletin, 18(3), 1995, pp. 19–28.

G. Graefe and D.J. DeWitt, "The Exodus Optimizer Generator", In Proceedings of the 1987 ACM International Conference on Management of Data (SIGMOD '87), 1987, pp. 160–172.

G. Graefe and W.J. McKenna, "The Volcano Optimizer Generator: Extensibility and Efficient Search", In Proceedings of the Ninth International Conference on Data Engineering, 1993, pp. 209–218.

D. Gunopulos, G. Kollios, V.J. Tsotras and C. Domeniconi, "Approximating Multi–Dimensional Aggregate Range Queries Over Real Attributes", In Proceedings of the 2000 ACM International Conference on Management of Data (SIGMOD '00), 2000, 12 pages.

L.M. Haas, J.C. Freytag, G.M. Lohman and H. Pirahesh, "Extensible Query Processing in Starbust," In Proceedings of the 1989 ACM International Conference on Management of Data (SIGMOD '89), 1989, pp. 377–388.

M. Muralikrishna and D.J. DeWitt, "Equi–Depth Histograms for Estimating Selectivity Factors for Multidimensional Queries", In Proceedings of the 1988 ACM International Conference on Management of Data (SIGMOD '88), 1988, 9 pages.

G. Pietetsky–Shapiro and C. Conneli, "Accurate Estimation of the Number of Tuples Satisfying a Condition", In Proceedings of the 1984 ACM International Conference on Management of Data, (SIGMOD '84), 1984, pp. 256–276.

V. Poosala and Y.E. Ioannidis, "Selectivity Estimation Without the Attribute Value Independence Assumption", In Proceedings of the Twenty–Third International Conference on Very Large Databases, (VLDB '97), Aug. 1997, pp. 486–495.

V. Poosala, Y.E. Ioannidis, P.J. Haas and E.J. Shekita, "Improved Histograms for Selectivity Estimation of Range Predicates", In Proceedings of the 1996 ACM International Conference on Management of Data, (SIGMOD '96), 1996, pp. 294–305.

R. Pottinger and A.Y. Levy, "A Scalable Algorithm for Answering Queries Using Views", In VLDB 2000, Proceedings of $26^{th}$ International Conference on Very Large Data Bases, 2000, pp. 484–495.

P.G. Sellinger, M.M. Astrahan, D.D. Chamberlin, R.A. Lorie and T.G. Price, "Access Path Selection in a Relational Database System", In Proceedings of the 1979 ACM International Conference on Management of Data (SIGMOD '79), 1979, pp. 23–34.

M. Stillger, G.M. Lohman, V. Markl and M. Kandil, "LEO–DB2's Learning Optimizer", In Proceedings of the Twenty–seventh International Conference on Very Large Databases, 2001, 10 pages.

* cited by examiner

```
SELECT *
FROM R,S,T
WHERE R.w=S.x
      AND S.y=T.z
      AND R.a<10
      AND T.b>20
```

(a)

(b)

(c)

ORIGINAL HISTOGRAMS

STEP 1

STEP 2

(a)

(b)

METHOD AND APPARATUS FOR EXPLOITING STATISTICS ON QUERY EXPRESSIONS FOR OPTIMIZATION

TECHNICAL FIELD

The invention relates generally to the field of relational databases and specifically to the field of optimizing queries on databases.

BACKGROUND OF THE INVENTION

Most query optimizers for relational database management systems (RDBMS) rely on a cost model to choose the best possible query execution plan for a given query. Thus, the quality of the query execution plan depends on the accuracy of cost estimates. Cost estimates, in turn, crucially depend on cardinality estimations of various sub-plans (intermediate results) generated during optimization. Traditionally, query optimizers use statistics built over base tables for cardinality estimates, and assume independence while propagating these base-table statistics through the query plans. However, it is widely recognized that such cardinality estimates can be off by orders of magnitude. Therefore, the traditional propagation of statistics that assumes independence between attributes can lead the query optimizer to choose significantly low-quality execution plans.

The query optimizer is the component in a database system that transforms a parsed representation of an SQL query into an efficient execution plan for evaluating it. Optimizers usually examine a large number of possible query plans and choose the best one in a cost-based manner. To efficiently choose among alternative query execution plans, query optimizers estimate the cost of each evaluation strategy. This cost estimation needs to be accurate (since the quality of the optimizer is correlated to the quality of its cost estimations), and efficient (since it is invoked repeatedly during query optimization).

Although the implementation details of commercially available optimizers vary, most if not all optimizers share the same basic structure shown in FIG. 2. For each incoming query, the optimizer maintains a set of sub-plans already explored, taken from an implicit search space. An enumeration engine navigates through the search space by applying rules to the set of explored plans. Some optimizers have a fixed set of rules to enumerate all interesting plans while other implement extensible transformational rules to navigate through the search space. All systems use dynamic programming or memoization to avoid recomputing the same information during query optimization. For each discovered query plan, a component derives different properties if possible, or estimates them otherwise. Some properties (e.g. cardinality and schema information) are shared among all plans in the same equivalence class, while others (e.g. estimated execution cost and output order) are tied to a specific physical plan. Finally, once the optimizer has explored all interesting plans, it extracts the most efficient plan, which serves as the input for the execution engine.

A useful property of a query plan from an optimization perspective is the estimated execution cost, which ultimately decides which is the most efficient plan. The estimated execution cost of a plan, in turn, depends heavily on the cardinality estimates of its sub-plans. Therefore, it is fundamental for a query optimizer to rely on accurate and efficient cardinality estimation algorithms.

Referring now to FIG. 3(a) and given that $|R| \approx |S| \approx |T|$, if the query optimizer has knowledge that R.a<10 is much more selective than T.b>20 (i.e., just a few tuples in R verify R.a<10 and most of the tuples in T verify T.b>20), the optimizer should determine the plan $P_1$ in FIG. 3(b) as more efficient than $P_2$ in FIG. 3(c). The reasons is that $P_1$ first joins R and S producing a small intermediate result that is in turn joined with T. In contrast, $P_2$ produces a large intermediate result by first joining S and T.

Cardinality estimation uses statistical information about the data that is stored in the database system to provide estimates to the query optimizer. Histograms are the most common statistical information used in commercial database systems. A histogram on attribute x consists of a set of buckets. Each bucket $b_i$ represents a sub-range $r_i$ of x's domain, and has associated with it two values: $f_i$ and $d_{vi}$. The frequency $f_i$ of bucket $b_i$ corresponds to the number of tuples t in the data set for which t.x∈$r_i$, and the value $dv_i$ of bucket $b_i$ represents the number of distinct values of t.x among all the tuples t for which t.x∈$r_i$. The main assumption is that the distribution of tuples inside each histogram bucket is uniform. The uniform spread model inside buckets implies that each bucket $b_i$ is composed of $dv_i$ equidistant groups of $f_i/dv_i$ tuples each. The density of a bucket is defined as $\delta_i = f_i/dv_i$, i.e., the number of tuples per distinct value (assuming uniformity) that are represented in the bucket. Other techniques for modeling bucket contents are also known such as the continuous or randomized models.

Histograms are currently used to estimate the cardinality of complex query plans as follows. The uniformity assumption inside histogram buckets suggests a natural interpolation-based procedure to estimate the selectivity of range and join predicates. Given the selection query $\sigma_{R.a<20}(R)$ and a histogram on R.a, the cardinality of the query is estimated by considering, one at a time, all histogram buckets that are completely or partially covered by the predicate and aggregating all intermediate results.

FIG. 4 illustrates a four-bucket histogram on attribute R.a. Bucket $b_1$ covers $0 \leq x \leq 10$ and has a frequency of 100 (i.e. it represents 100 tuples in the data set). Similarly, buckets $b_2$, $b_3$, and $b_4$ represent 50, 80, and 100 tuples, respectively. The histogram can be used to estimate the cardinality of the range predicate p=R.a<20. Since p completely includes bucket $b_1$, all 100 tuples in $b_1$ must verify p. Also p is disjoint with buckets $b_3$ and $b_4$, so no single tuple in $b_2$ of $b_4$ verifies p. Finally, p partially overlaps with bucket $b_2$ (in particular, p is verified by 50% of $b_2$'s uniformly spread distinct values). Therefore based on the uniformity assumption that 50% of the tuples in $b_2$ verify p, the number of tuples verifying predicate p=R.a<20 is estimated to be 100+50/2=125.

In general, selection queries may have multiple predicates on different attributes on the table. For example, given the query:

SELECT * FROM R
WHERE R.a>10 AND R.b<100 and assuming there are histograms on R.a and R.b available, if $s_a$ is the selectivity for R.a>10 and $s_b$ is the selectivity for R.b<100, the selectivity for the whole predicate is estimated, assuming independence as $s_a \cdot s_b$. Multidimensional histograms have proved to be accurate in modeling attribute's correlation. However, these novel estimation techniques are not widely used in commercial databases yet.

Histograms are used to estimate the selectivity of join queries such as $R \bowtie_{x=y} S$. Histograms on R.x and S.y can be used to improve the accuracy of the cardinality estimation. Referring to FIG. 5, histograms $H_{R.x}$ and $H_{S.y}$ have buckets that are delimited by square brackets. The procedure to estimate the cardinality of the join predicates follows. In Step 1, the histogram buckets are aligned so that their boundaries agree (usually splitting some buckets from each histogram). Buckets $b_2$ and $b'_2$ in FIG. 5 share the same left boundary. However, bucket $b_2$ spans beyond bucket $b'_2$'s right boundary. Therefore, we split bucket $b_2$ into two sub-buckets. The left sub-bucket boundary agrees with that of bucket $b'_2$. The right sub-bucket boundary starts at the same position as bucket $b'_3$ but ends before $b'_3$ does. Bucket $b'_3$ is split in the same way, and this procedure continues until all original buckets are aligned as shown in Step 2. This approach at most doubles the total number of buckets in both histograms.

After the buckets are aligned, a per bucket estimation of join sizes is performed. Many techniques can be used to perform this estimation. For example, using the containment assumption, it is concluded that each group of distinct valued tuples belonging to the bucket with minimal number of different values joins with some group of tuples in the other bucket. For instance, in Step 2 of FIG. 5, the three groups of tuples from the upper bucket are assumed to match with three of the five groups of tuples in the lower bucket. The result of joining the pair of buckets is modeled as a new bucket with three distinct values and density 40=2·20. Each distinct value in the resulting bucket represents 40 tuples, which is the product of the original bucket densities. Therefore, the frequency of the new bucket is 120=3·40.

After applying the same procedure to each pair of aligned buckets, the third and last step consists of aggregating the partial frequencies from each resulting bucket to get the cardinality estimation for the whole join.

The techniques discussed with respect to selection and join queries are used when the predicates are directly applied to the base tables that hold the histograms involved. For select project join (SPJ) queries the cardinality estimation requires propagating statistics through predicates. An example of an SPJ query follows:

SELECT * FROM R,S
WHERE R.x=S.y AND S.a<10

Assuming histograms on R.x and S.y and S.a are available, there are two ways to estimate the selectivity of the whole expression, outlined as FIGS. 6(a) and 6(b). In one approach, histograms for R.x and S.y may be used to estimated the selectivity of R⋈S ignoring the predicate S.a<10. Then assuming independence between S.y and S.a, the histogram for S.a is propagated through the join upwards in the tree. The propagated histogram is then used to estimate the selectivity of S.a<10 over the result from R⋈S, to finally obtain the selectivity of $\sigma_{S\ a<10}$(R⋈S).

Another approach is to use the histogram for S.a to first estimate the selectivity of $\sigma_{S\ a<10}$(S). Then, assuming independence between S.y and S.a, the histogram for S.y is propagated though the selection operator and used together with the histogram of R.x to estimate the selectivity of R⋈($\sigma_{S\ a<10}$(S)). It is important to note that although the two methods above estimate the same expression, i.e., R⋈($\sigma_{S\ a<10}$(S))≡$\sigma_{S a<10}$(R⋈S), the resulting estimation can be slightly different.

SUMMARY OF THE INVENTION

Maintaining statistical information on intermediate query expressions can improve the accuracy of cardinality estimations for complex queries that might otherwise require extensive propagation of statistical information on base tables.

A method for evaluating a user query accesses stored statistics for the results of intermediate query components. A query optimizer generates a query execution plan and each query plan includes a plurality of intermediate query plan components that verify a subset of records from the database meeting query criteria. The method accesses a query plan and a set of stored intermediate statistics for records verified by query components of the query plan and selects intermediate statistics, such as a cardinality of the query components, that apply to the query. The method forms a transformed query plan based on the selected intermediate statistics (possibly by rewriting the query plan) and estimates the cardinality of the transformed query plan to arrive at a more accurate cardinality estimate for the query. For example, one type of intermediate statistic is a histogram that describes the records verified by a given query component.

For some relational databases, the intermediate statistics are viewed as hypothetical base tables having statistics on a given attribute by the query optimizer. A set of intermediate statistics that minimizes a number of independence assumptions that will be made in evaluating the query plan is compiled by selecting additional statistics that, when applied in conjunction with the selected set, minimize the number of independence assumptions that will be made in evaluating the query plan. Intermediate statistics continue to be selected for the set of selected statistics until no new intermediate statistic can be applied.

If additional intermediate statistics are necessary, and where the relational database has a workload that includes a set of queries that have been executed on the database, a pool of intermediate statistics may be generated based on the queries in the workload. For example, the pool of intermediate statistics may be generated by evaluating the benefit of a given intermediate statistic over the workload and adding intermediate statistics to the pool that provide relatively great benefit. The benefit of a given intermediate statistic may be evaluated by assigning a hypothetical distribution to an attribute corresponding to the intermediate statistic and estimating the cost of evaluating the workload given the hypothetical distribution. A plurality of hypothetical distributions may be assigned to a given attribute and the workload is evaluated for each hypothetical distribution. Distributions having minimal and maximal cardinalities may be hypothetically assigned to the given intermediate attribute and a cost to execute the queries in the workload may be estimated according to the hypothetical distributions. If a difference in the costs is among the highest differences of all the hypothetical distributions, the intermediate statistic is added to the pool of intermediate statistics. Previously selected intermediate statistics may be discarded if they do not provide a predetermined benefit when used by the query optimizer to evaluate queries in the workload.

At least one of the stored intermediate statistics may be generated by approximating a result of a query component and computing statistics on the approximate result. These and other objects, advantages, and features of the invention will be better understood from the accompanying detailed description of a preferred embodiment of the invention when reviewed in conjunction with the accompanying drawings.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Exemplary Operating Environment

Figure 1:
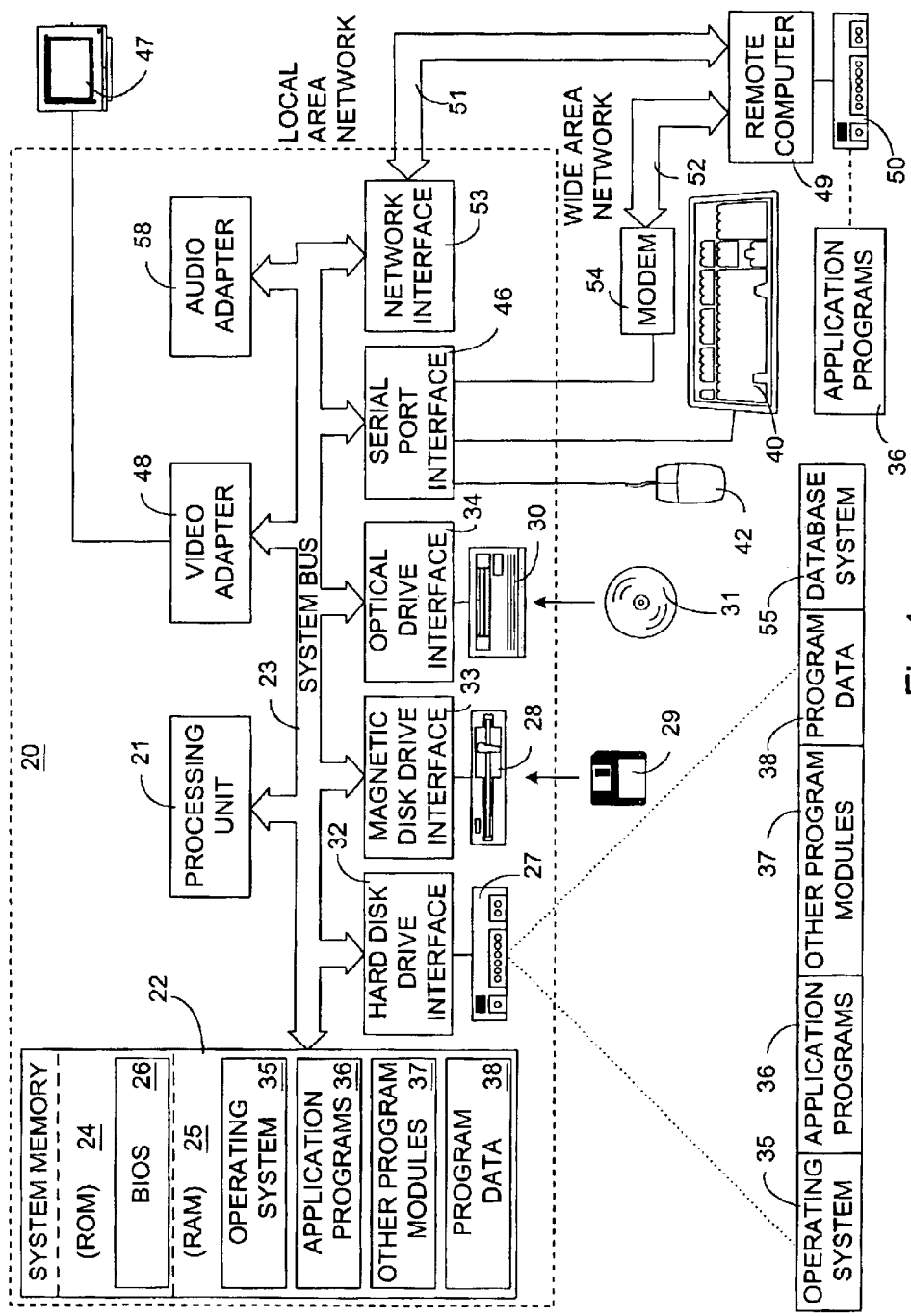
FIG. 1 illustrates an exemplary operating environment for a system for evaluating database queries using statistics maintained on intermediate query results.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Figure 2:
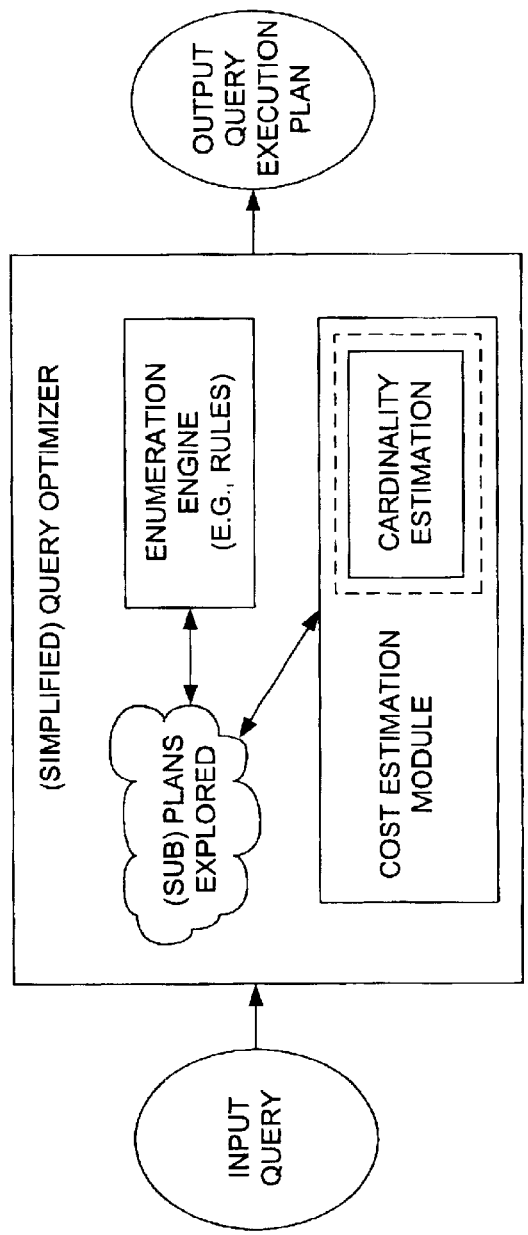
FIG. 2 is a block diagram of a prior art optimizer that can be used to implement the present invention.
Figure 6:
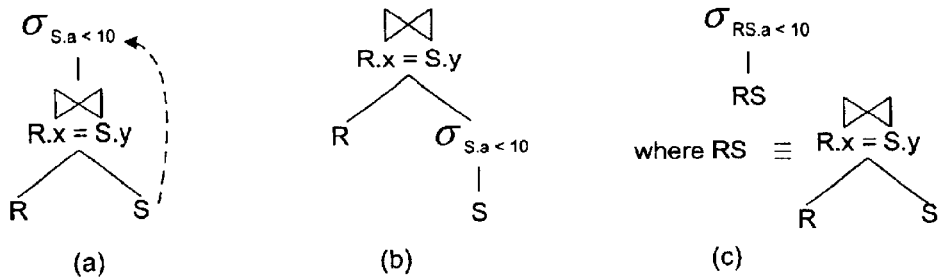
FIG. 6 illustrates an example of histogram propagation using prior art techniques as well as an embodiment of the present invention.

Cost Estimation Using Cardinality Estimates Based on Statistics on Intermediate Tables Referring again to FIG. 2, as already explained, the query optimizer examines an input query and generates a query execution plan that most efficiently returns the results sought by the query in terms of cost. The cost estimation module and its imbedded cardinality estimation module can be modified to utilize statistics on query expressions, or intermediate tables (these statistics will hereinafter be designated SITs) to improve the accuracy of cardinality estimates. FIG. 6(c) illustrates a query plan that leverages a SIT, namely statistics on the join $R \bowtie S$. If statistics on the result of the query expression $RS = R \bowtie S$ (specifically on RS.a) are built, the cardinality of the original query plan is estimated by estimating the cardinality of the equivalent plan $\sigma_{R.S.\ a<10}(RS)$. This estimation technique avoids propagating estimation errors through the join predicates. For complex query plans, the beneficial effect of having statistics on a query expression that matches an intermediate subexpression of the query being evaluated is magnified since it avoids the propagation of errors through a sequence of operators.

For the purposes of this description, a SIT is defined as follows: Let R be a table, A an attribute of R, and Q an SQL query that contains R.A in the SELECT clause. SIT(R.A|Q) is the statistic for attribute A on the result of the executing query expression Q. Q is called the generating query expression of SIT (R.A|Q). This definition can be extended for multi-attribute statistics. Furthermore, the definition can be used as the basis for extending the CREATE STATISTICS statement in SQL where instead of specifying the table name of the statistic, a more general query expression such as a table valued expression can be used.

One way to build and update SITs is executing the generating query expression associated with the SIT and building the necessary statistics on the result of the query. Once the statistics have been computed, the results of the query expression can be discarded. When explicitly requested or triggered by the system, updating of the statistics can be accomplished by recomputation and rebuilding of the statistics. In addition, for a large class of query expressions, more efficient techniques drawn from the wide body of work in approximate query processing can be used. This is possible because statistical distributions rather than exact results are necessary to build SITs. For example, the construction of SITs with generating queries consisting of foreign-key joins can be efficiently preformed by using sampling. Furthermore, existing indexes and statistics can also be leveraged for efficient computation of SITs. For the purposes of this description, it is assumed that SITs are built on query expressions using some technique. The remainder of the description details how to select and apply SITs to a given query as well as how to automatically select a particularly useful subset of all generated SITs to be maintained for use by the cost estimation module.

In general, the use of SITs is enabled by implementing a wrapper (shown in phantom in FIG. 2) on top of the original cardinality estimation module of the RDBMS. During the optimization of a single query, the wrapper will be called many times, once for each different query sub-plan enumerated by the optimizer. Each time the query optimizer invokes the modified cardinality estimation module with a query plan, this input plan is transformed by the wrapper into another one that exploits SITs. The cardinality estimation module uses the input plan to arrive at a potentially more accurate cardinality estimation that is returned to the query optimizer. The transformed query plan is thus a temporary structure used by the modified cardinality and is not used for query execution.

According to the described embodiment, the transformed plan that is passed to the cardinality estimation module exploits applicable SITs to enable a potentially more accurate cardinality estimate. The original cardinality estimation module requires little or no modification to accept the transformed plan as input. The transformation of plans is performed efficiently, which is important because the transformation will be used for several sub-plans for a single query optimization.

Figure 7:
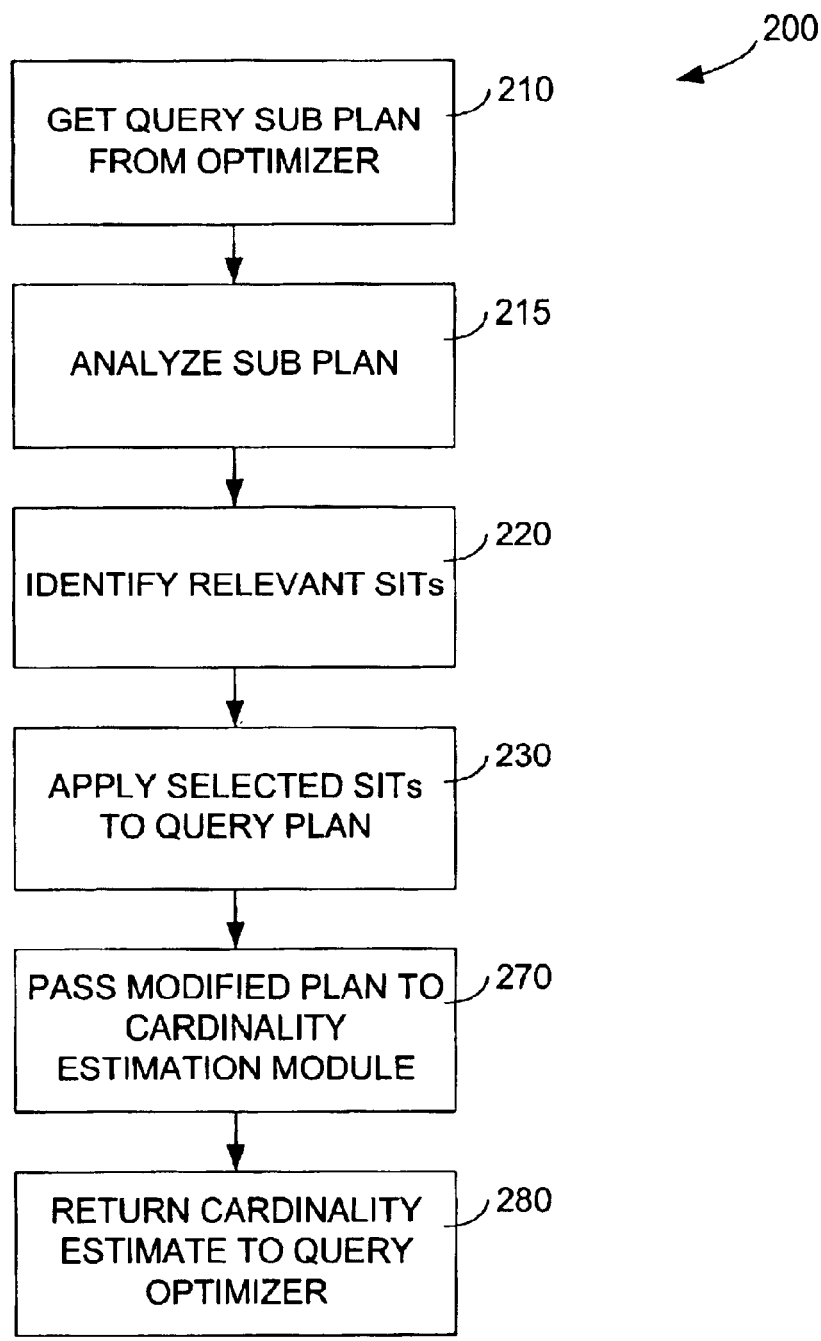
FIG. 7 is a flowchart of a method for exploiting statistics on intermediate query results according to an embodiment of the present invention.

For the purposes of this description it is assumed that both the incoming queries and the queries used to generate SITs are SPJ queries where the filter expression is a conjunction of simple predicates. FIG. 7 is a flowchart that outlines a method 200 for operating the cardinality estimation module shown in FIG. 2 in a manner that leverages SITs. The steps, which will described in detail, can be summarized as: analyzing the query plan, identifying and applying relevant SITs, and estimating and returning the transformed query plan.

Figure 8:
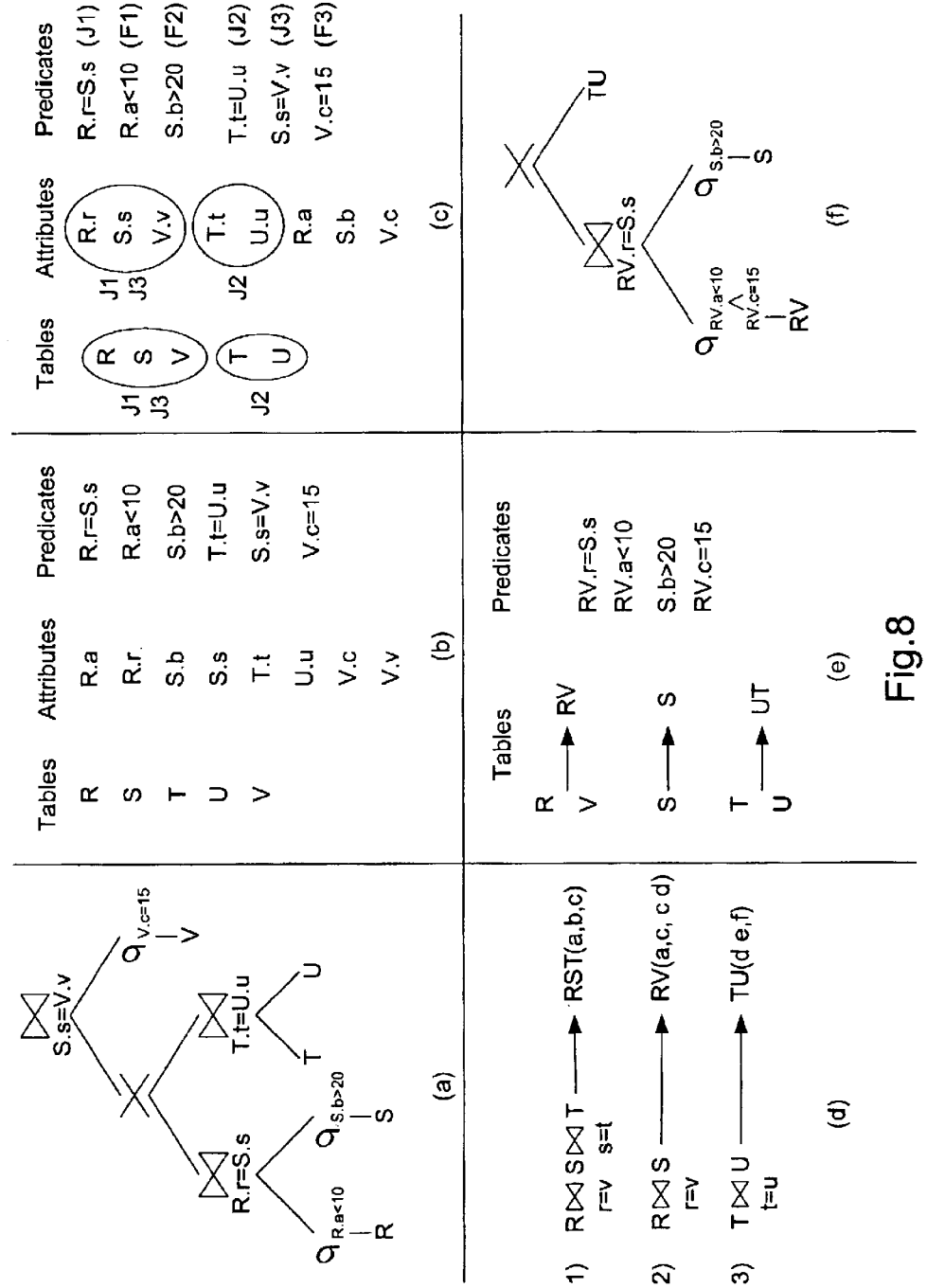
FIG. 8 is an example of a transformation algorithm applied according to an embodiment of the present invention.

In step 210, a query sub plan that has been enumerated by the enumeration engine is passed to the cardinality estimation module wrapper (shown in phantom in FIG. 2) from the query optimizer. An example of a query plan is shown in FIG. 8(a). A structure analysis is performed on the query in step 215 that will help to identify and apply SITs to the query. The tables and columns referenced in the query and the list of conjunctive predicates are identified. For the query plan shown in FIG. 8(a), this step is illustrated in FIG. 8(b). The predicates are classified as either filter predicates or join predicates. The equality join predicates are used to generate column equivalence classes and also to get the set of table subsets that are joined. FIG. 8(c) shows the results of this step. The filter predicates are marked with an F label, and the join predicates with a J label. Tables R, S, and V are joined using predicates $J_1$ and $J_3$, and tables T and U are joined using join predicate $J_2$. In a similar way, columns R.r, S.s, and V.v form one equivalence class, columns T.t and U.u from another equivalence class, and the remaining columns form singleton classes. More complex analysis can be performed in this step depending on the set of rewriting transformations that are applied later.

In step 220, a set of relevant SITs is identified. For ease of notation, the set of available SITs is grouped by their generating query, as shown in FIG. 8(d). A set that includes $SIT(Q|a_1), \ldots, SIT(Q|a_n)$, are represented by the following SIT-Set notation: $Q \rightarrow S[a_1, \ldots, a_n]$ where S is the SIT-Set identifier that holds the set of statistics $\{SIT(Q|a_1), \ldots, SIT(Q|a_n)\}$. Given a query q (or its plan) and a SIT-Set S defined by the generating query expression Q, SIT-Set S is potentially useful for cardinality estimation of q if some attributes $a_i$ are referenced in the selection condition of q and there is an "occurrence" of Q in q. To verify the latter, known algorithms used for materialized view matching can be utilized.

In general, more than one SIT-Set may be applicable to a query expression. In step 220 (FIG. 7), SIT-Sets are selected to be applied to the query plan in step 230. FIG. 8(d) lists SIT-Sets that are available in the running example. The second SIT-Set that uses as its generating expression the join $R \bowtie_{r=v} V$ can be used for the query in FIG. 8(a). Note that this SIT-Set shows the use of single column SITs on attributes a and c, and multi-column SIT on attributes (c d). The statistical object associated with a multi-column SIT will have the same structure as any multi-column statistics on base tables. The third SIT-Set can be applied in conjunction with the first one (see FIG. 8(e)). The resulting query plan is shown in FIG. 8(f), for which tradition cardinality estimation can be used as just described (see also step 230 in FIG. 7). No SIT is used for attribute S.b, so a base table statistic (if available) will be used in that case.

In the preceding example, the use of one SIT-Set did not interfere with the use of another. In some cases, application of SIT-Sets may not be compatible. For example, if a fourth SIT-Set, R⊳⊲S→RS[a,b], is added in FIG. 8(d) then whenever this SIT-Set could be used for a query so is RS. However, RST will be favored over RS. The reason is that while estimating the cardinality of the query transformed using RST, fewer independence assumptions are made compared to using RS. As already discussed, the use of the independence assumption is responsible for error propagation. It is possible that RS may be applicable in cases where RST is not. These considerations are similar to the case of materialized view matching.

A more complex scenario occurs when the use of one SIT-Set results in a rewriting that excludes the use of other SIT-Sets which can still be useful to improve cardinality estimation. For example, given the following SIT-Sets:

S⊳⊲$_{s=t}$T ST[b,c]
R⊳⊲$_{r=s}$S⊳⊲$_{r=t}$T RST[a]
R⊳⊲$_{r=c}$T RT[a,c]

an estimate of the cardinality of the following query is needed:

SELECT * FROM R,S,T
WHERE R.r=S.s AND S.s=T.t AND
    R.a<10 AND T.c>20

SIT-Set RST can be applied to the given query. Note that the join predicated R.r=T.t in RSTs generating query is equivalent to the join predicate S⊳⊲$_{s=t}$T in the query given modulo column equivalence. RST is applied to the query, replacing R⊳⊲$_{r=s}$S⊳⊲$_{s=t}$T in the query with SIT-Set RST. In this case, SIT(a|RST) will be used for the filter condition R.a<10, but SIT(c|RST) is not available. Instead, SIT(c|ST) from SIT-Set ST can be used to avoid assuming independence between T.c and T.t (it should be noted that independence is implicitly assumed in this case between T.c and R⊳⊲ST). SIT(c|ST) can be used because ST is compatible with RSTs generating query. However, SIT(c|RT) from SIT-Set RT cannot be used due to the join predicate R.r=T.c in its generating query.

This example underscores the point that simple materialized view rewriting is not sufficient in some cases, since such rewriting cannot account for the use of statistics such as SIT(c|ST) in the example. Therefore when considering application of any given SIT-Set S to a query q, the following steps are taken. First, it is verified that S's generating query is applicable to q and a rewriting that uses the SIT-Set is determined. For each attribute of q that potentially affects cardinality estimation, but is not covered by S (i.e. it occurs in one or more predicates of q but it is not among the attributes from which S provides statistics), a SIT is sought that would provide the best alternative for estimation. Such a SIT must come from a SIT-Set whose generating query is subsumed by the original SIT-Set's generating query, or the result might not be correct. In particular, if many options exist, the SIT is selected that would require the fewest number of independence assumptions when the cardinality of the resulting query is estimated. This attempt to minimize the number of independence assumptions is justified since it is independence assumptions that are the source of error propagation for cardinality estimation. These additional SITs are referred to as auxiliary SITs due to the application of SIT-Set S to query q. In some cases, no auxiliary SITs may be necessary.

In order to minimize the number of applications of independence assumptions in the resulting query, a greedy heuristic has been adopted to determine the SIT-Sets and auxiliary SITs that should be applied for a given input query. For each SIT-Set S, rewriting of the query with S is considered and at the same time the set of auxiliary SITs that are applicable is identified. Next, a count is made of the number of independence assumptions that must be made by a traditional cardinality estimation module if the given SIT-Set and its auxiliary SITs are applied to the given input query. This provides a score for each SIT-Set, and the SIT-Set with the lowest score is selected. After applying the selected SIT-Set, the procedure is repeated until no new SIT-Sets qualify. The following is a pseudo-code that summarizes the selection process of steps 220 and 230 in FIG. 7.

```
01  while more SIT-Sets can be applied to the query q
02      Select the SIT-Set compatilble with q that minimizes the
            number of independence assumptions
03      Apply the selected SIT-Set and auxiliary SITs
```

As an example, if all SIT-Sets' generating queries consist only of joins (non selections) and the attributes in the predicate of the input query plan are $\{a_1, \ldots, a_k\}$, the number of independence assumptions is minimized when each attribute uses a SIT with the maximal number of joined tables in its generating query. In such a scenario, the SIT-Set (and its auxiliary SITs) is found that maximizes the value $\Sigma_{i=1}^{k}|Ant_i|$, where $|Ant_i|$ is the number of joined tables in the generating query expression that provides the SIT for attribute $a_i$. The value of $|Ant_i|$ for an attribute that does not use a SIT is set to one if such attribute has a base-table statistic available, or zero otherwise.

In step 270 the modified plan is passed to the cardinality estimation module and a cardinality estimate is returned to the cost query optimizer in step 280. It is important to note again that the transformed query is not used outside the modified cardinality estimation module because such use would cause problems because some of the tables referenced in the transformed plan do not exist as tables in the system.

For some simple query transformations, the original cardinality estimation module does not need to change at all except for the need to use hypothetical tables for cardinality estimation. For more complex query transformations, however, some modifications are made to the module. For example, to handle the auxiliary SITs just discussed, the cardinality estimation module is augmented with statistical hints that detail specifically which statistic in the system is to be used for specific attributes.

Figure 9:
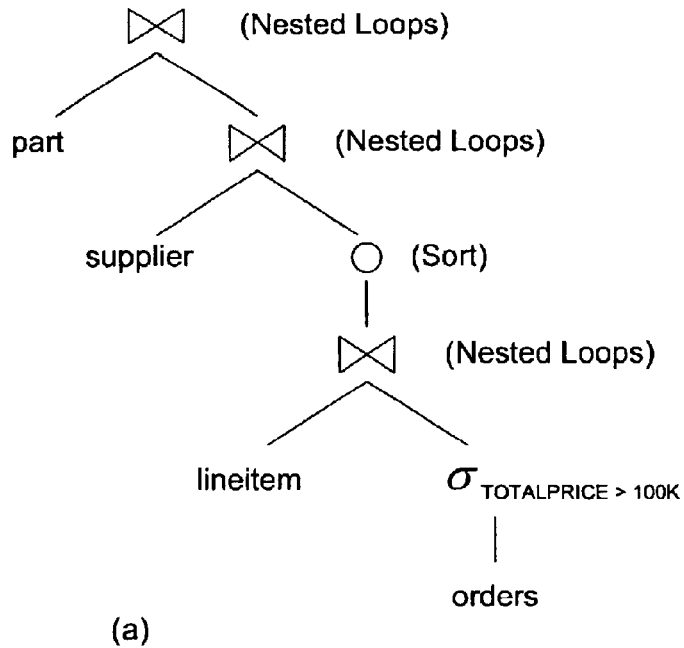
FIG. 9 is an example of query execution plans generated by a prior art optimizer and an optimizer utilizing an embodiment of the present invention.
Figure 9:
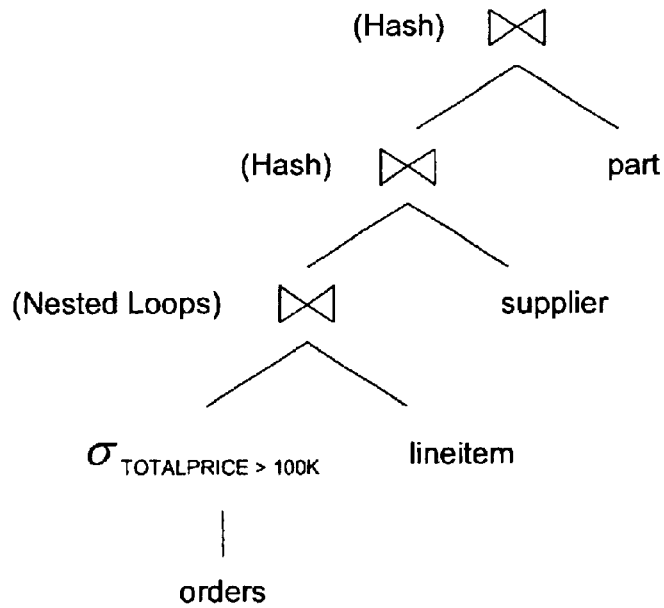

FIG. 9 illustrates the results of an experiment in which a query was transformed into a query plan using traditional techniques (9(a)) and was also transformed into a modified query plan (9(b)) using SITs as just described. The TPC-H benchmark schema was used, but it was extended to support data generation with varying degree of skew. In particular, the generator produces data for each column in the schema from a zipfian distribution. Zipfian distributions are also applied to foreign key joins, so for example, the number of tuples in lineitem that join with each tuple in orders follows a zipfian distribution.

TPC-H data sets were generated using a skew factor z=1 to reach a sample database with a size of 100 MB. The following query, which asks for information about the most expensive orders (those with a total price greater than 1,000,000) was used as the original query:

SELECT * FROM lineitem, orders, part, supplier
    WHERE l_orderkey=o_orderkey and l_partkey=p_partkey and
l_suppkey=s_suppkey and
o_totalprice>1000000

In the sample database $|\sigma_{o\_orderprice>1000000}$ (orders)$|$= 120, i.e. 120 out of 750,000 tuples in orders verify the filter condition (the selectivity is lower than 0.02%). However, precisely those tuples are joined with a very large number of tuples in lineitem (that is the reason they are so expensive). In fact, in the sample database, $|\sigma_{o\_totalprice>1,000,000}$ (orders$\bowtie$lineitem)$|$=971,851 out of 2,943,815 tuples (the selectivity is around 33%). Clearly, propagation of the histogram for o_totalprice through the join orders $\bowtie$lineitem would incur large estimation errors, potentially affecting the optimizer's choice of an execution plan.

When the query was optimized using a standard optimizer, the query plan shown in FIG. 9(a) was obtained. To arrive at this plan, the original optimizer estimated that the result size of the subquery lineitem$\bowtie\sigma_{o\_totalprice>1,000,000}$ (orders) is small (713 tuples), therefore the optimizer chose to sort this intermediate result before pipelining it to the next nested loop join with supplier. Since the estimated intermediate result is still small, another nested loop join is used with part to obtain the final result. The execution time of this query plan was 419 seconds.

For the modified optimizer, all possible SITs were made available to the query optimizer. When the query was optimized using SITs, the query plan shown in FIG. 9(b) was obtained. Using SITs, the modified query optimizer accurately estimated that the number of tuples in lineitem$\bowtie$orders is large (970,627 tuples) and chose a different set of operators. In particular, the expensive sort operation was removed and the nested loop joins were replaced with the (more efficient) hash joins (in some cases the inner/outer role of the tables is reversed). The execution time of the query according to the modified query plan was 23 seconds, or less than 6% of the original plan.

Selecting a Set of SITs Based on Workload

The preceding example showed the benefit of having SITs available for query optimization. However, building SITs for all possible intermediate results is not viable even for moderate schema sizes: loading many statistics and incrementally maintaining them can be very expensive. Therefore, it is important to select a small subset of SITs that are sufficient to increase the quality of the query plans produced by the optimizer. One approach to address this problem is to take into consideration workload information. According to this approach, given workload information and a space constraint, a set of SITs is found that fits in the available space so that the actual cost from answering queries in similar workloads is minimized or reduced. Other criteria besides space, such as update cost, could be relevant to SIT selection.

According to the described embodiment, a small subset of SITs is chosen in such a way that the quality of plans chosen by the optimizer is not compromised. Each attribute $a_i$ that occurs in the filter predicates of the input queries is considered to obtain the optimized query plans assuming that the attribute $a_i$ has different skewed hypothetical distributions. A variant of this technique has been given the name "Magic Number Sensitivity Analsysis" or MNSA. MNSA is described in detail in the context of automatic selection of base table statistics, rather than statistics on intermediate tables as is the present case, in U.S. patent application Ser. No. 09/513,833 to Chaudhuri et al entitled "Automating Statistics Management for Query Optimization". The '833 application is incorporated in its entirety herein by reference.

Intuitively, for a given attribute $a_i$, if the estimated difference in cost of the obtained plan query plan (assuming different distributions for $a_i$) is close to zero, the introduction of more detailed information (SITs) on $a_i$ will result in little effect, if any, on the quality of plans chosen by the optimizer. In contrast, if the cost difference is significant, chances are that a SIT over attribute $a_i$ can provide relevant information and help the optimizer to choose the correct query plan. Once it is determined that the presence of a SIT on attribute $a_i$ could improve the quality of plans chosen by the query optimizer, it is necessary to identify which generating query should be used for attribute $a_i$. While the following discussion will focus on a workload consisting of SPJ queries, it is contemplated that the method can be applied to more general queries.

It has been observed that in the context of base table statistics, the workload-based MNSA technique can significantly reduce the set of base-table statistics that need to be created in a database system without sacrificing the quality of generated query plans. A relaxed notion of plan equivalence is exploited to make this selection. In particular, two plans $p_1$ an $p_2$ are t-Optimizer-Cost equivalent if the query optimizer predicts that the execution costs of $p_1$ and $p_2$ are within t percent of each other, where t reflects the degree of rigor used to enforce equivalence.

For a given workload, the base table MNSA algorithm incrementally identifies and builds new statistics over the base tables until it determines that no additional statistic is needed. To test whether the current subset of statistics is enough for estimation purposes, MNSA considers how the presence of such statistics would impact optimization of queries without building statistics first. For this purpose, MNSA replaces the magic selectivity numbers, which are used by the optimizer in the absence of statistics, with extremely small and large values (in practice $\epsilon$ and $1-\epsilon$, with $\epsilon=0.0005$). It then verifies whether the optimized query plans are insensitive, i.e. t-Optimizer-Cost equivalent, to those changes. Under reasonable assumptions, if the query plans obtained by using these extreme predicted selectivities for all attributes without statistics are cost equivalent, then all actual plans for which the actual selectivities lie between those extremes will be t-Optimizer-Cost equivalent as well, and therefore the impact of materializing new statistics will be rather limited.

It is assumed that all needed base-table statistics are already materialized, either by using MNSA or some other equivalent procedure. However, MNSA cannot be applied directly to select SITs since the query optimizer does not rely on magic numbers for cardinality estimation of non-leaf expressions, i.e. simple variations of MNSA are not suitable for this generalized scenario. To overcome this limitation, the main ideas of MNSA are generalized by introducing estimation strategies that propagate cardinality information through query plans by making extreme assumptions about the distribution of attribute values.

The building blocks of the described algorithm for selecting a set of SITs are estimation strategies that make use of extreme hypothesis on the attribute distributions. For the purposes of this description, SPJ queries and histograms will be discussed, however other types of queries and statistics are contemplated by the present invention. Typical cardinality routines assume independence between attributes and propagate statistics through query plans. For example, the following query could be input to the optimizer:

SELECT * FROM R,S
WHER R.r=S.s AND S.a<10

If the cardinality of the predicate S.a<10 is estimated before the cardinality of the join (as in FIG. 6(b)), histogram S.s is uniformly scaled down so that the total number of tuples equals to the estimated cardinality of S.a. That is, if N is the number of tuples in table S, and $N_a$ is the number of tuples that verify predicate S.a<10, each bucket frequency from S.s's histogram is multiplied by the factor $$\frac{N_a}{N}.$$

After this transformation, R.r and S.s's histograms are used to estimate the cardinality of the join, as already explained. This default estimation strategy is called strategy Ind with respect to S.a since the independence assumption for attribute S.a is used. Two new estimation techniques, called Min and Max with respect to some attribute, make extreme assumptions about the statistical distribution of such attribute. In particular, instead of uniformly reducing the frequency of all tuples in histogram S.s, the $N_a$ tuples in S.s are selectively chosen that survive the filter condition are selectively chosen, so that the resulting join cardinality is the smallest (or largest) possible under the containment assumption, illustrated as follows.

Figure 10:
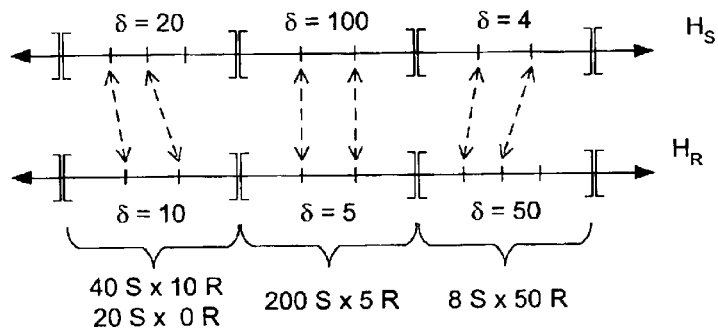
FIG. 10 is an example of extreme cardinality estimation using histograms according to an embodiment of the present invention.

Referring to FIG. 10, already aligned histograms on attributes R.r and S.s for the query above, which are denoted as $H_R$ and $H_S$, respectively. For instance, there are three groups of 20 tuples each in the first bucket of histogram $H_R$. At the bottom of the figure the number of tuples is shown that can be joined from each pair of buckets. For example, the expression 40S×10R below the first pair of buckets specifies that 40 tuples in S (two groups of 20 tuples each) can be joined with 10 tuples in R each. In the same way, the expression 20S×0R specifies that for 20 tuples in S (the remaining group of tuples) there is no tuple in R that matches them. If only 30 tuples in S verify the filter predicate S.a<10, using the Max strategy 8 tuples are chosen in $H_S$'s third bucket (since each tuple in the bucket joins with the largest number of tuples in R) and 22 out of the 40 tuples are chosen in $H_S$'s first bucket that join with 10 tuples in R. The estimated cardinality for the join then is 8·50+22·10= 620. In contrast, using the Min strategy, 20 tuples in S.s's first bucket are chosen that do not join with any tuple in R, and 10 out of the 200 tuples in S.s's middle bucket are also chosen. The estimated cardinality for the join is: 20·0+10·5= 50. For completeness, the Ind strategy scales down the densities for S.s by the factor 30/268 (268 being the cardinality of S), and therefore the estimated cardinality is 2.23·10+11.19·5+0.44·50=100.

Figure 12:
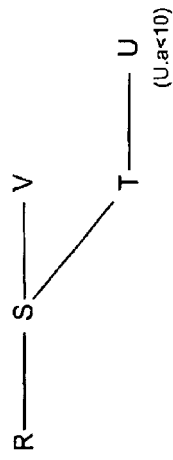
FIG. 12 is a join tree graph that illustrates an extreme cardinality estimation.
Figure 3:
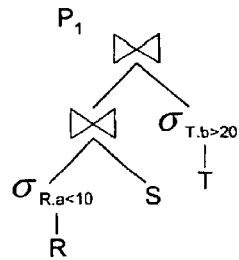
FIG. 3 is tree representation of query plans chosen by prior query optimizers.
Figure 3:
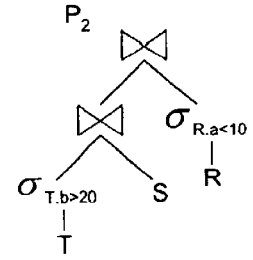
Figure 4:
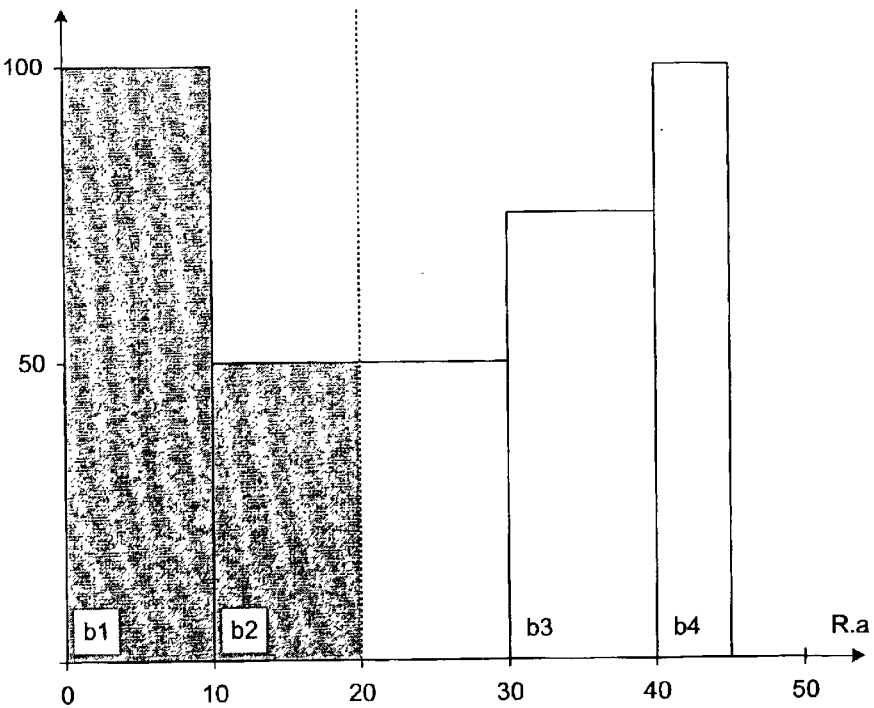
FIG. 4 is a graph of range selectivity estimations generated using prior art histogram techniques.
Figure 5:
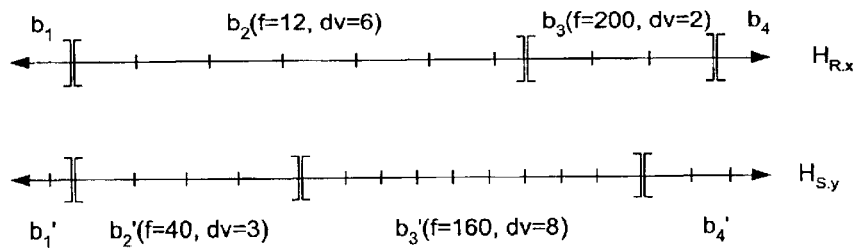
FIG. 5 illustrates an example of estimating a join selectivity using prior histogram techniques.
Figure 5:
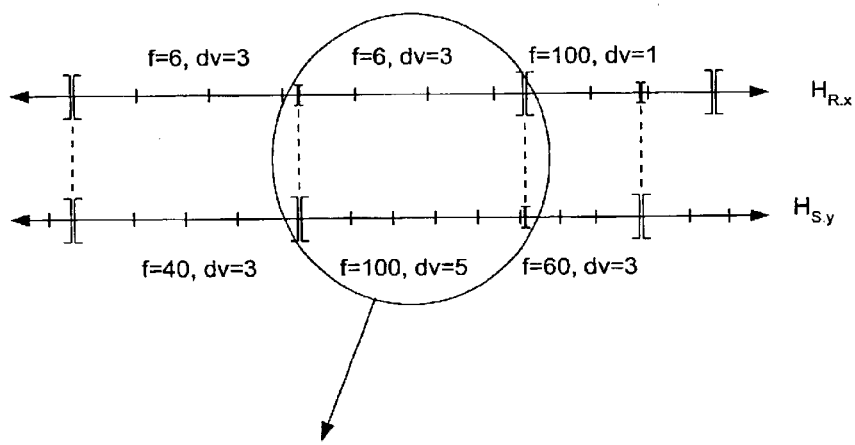
Figure 5:
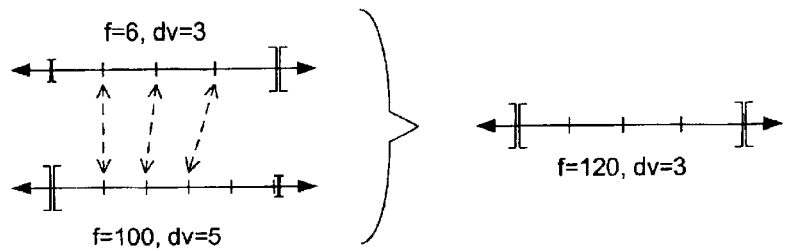

One procedure that can be used to select the appropriate tuples for strategy Min or Max is to sort the list of pairs at the bottom of FIG. 10 by increasing number of tuples in R, and select the first or last $N_a$ tuples in S from that sorted list. It can be proved that this procedure effectively chooses the set of tuples in S that minimize or maximize the number of tuples in the join. These strategies are not limited to just one join predicate, but can easily be extended to cope with multiple joins. Since both the Min and Max strategies return a cardinality value, the output cardinality of one join can be used as the input to the next join, in the same way as the Ind strategy, to get an extreme cardinality estimation for the complete join. A five way join is depicted in the join graph in FIG. 12.

Each edge in the join graph represents a join predicate between two tables. To get the Max cardinality estimation with respect to attribute U.a, first the cardinality of $\sigma_{U.a<10}$, $N_1$, is obtained using traditional techniques. Then the Max strategy is applied for the join T▷◁U, selecting the $N_1$ tuples in U so that the number of tuples in the result is maximized (the cardinality of the results of T▷◁U is denoted $N_2$). This procedure is repeated by selecting the $N_2$ tuples in (T▷◁U) that maximize the cardinality result of S▷◁(T▷◁U). The procedure continues in this way (joining the accumulated result first with R and finally with V) to obtain the extreme cardinality estimation for the whole join. Of course, instead of the join order used in this example, any order that is consistent with the topological order in the join graph is possible.

The preceding discussion involved queries having a single filter predicate. In more general cases, such as the following SPJ query: $\sigma_{p1}\char`\^ \ldots \char`\^_{pk}(R_1▷◁ \ldots ▷◁R_n)$, each column attribute $a_1, \ldots, a_k$ is assigned an estimation strategy (Min, Max, or Ind). The following algorithm outlines a procedure for getting the final cardinality estimation for generalized query cases:

---

01  Get the cardinality C of the join sub-query ($R_1$ ▷ ◁ ... ▷ ◁ $R_n$)
02  For each filter pi with attribute $a_i$, get the "partial" extreme selectivity $s_i$ of query $\sigma_{pi}(R_1$ ▷ ◁ ... ▷ ◁ $R_n)$ as explained above
03  Assuming independence multiply all "partial" selectivities with the join cardinality and return C · $\Pi_i s_i$

---

Note that in step 3, independence is assumed in the absence of multi-column statistics.

To arrive at a small set subset of SITs that do not compromise the quality of plans chosen by the optimizer, each attribute $a_i$ present in a query filter predicate is considered in turn to obtain the estimated execution costs when $a_i$ propagates through the query plan using the Min and Max strategies and the remaining attributes use the Ind strategy. Intuitively, if for attribute $a_i$ the difference in estimated cost between the two extreme strategies is close to zero, the introduction of any SIT on $a_i$ will result in little or no effect on the quality of plans produced by the optimizer. In contrast, if the cost difference is significant, chances are that a SIT over attribute $a_i$ can provide relevant information and help the optimizer to choose better quality query plans. In addition, this difference in estimated execution cost is a good estimator of the relative importance of the different attributes, and can be used to rank the candidate SITs.

Once a promising attribute for building a SIT is identified, it is necessary to determine which generating query should be used for the SIT. Referring again to the five way join graph depicted in FIG. 12, a large difference in estimated execution cost for the Min and Max strategies with respect to attribute U.a may come from correlation between attribute U.a and another attribute in an intermediate join. Therefore it is necessary to determine which SIT over U.a to build among several candidates, such as SIT(U.a|T▷◁U) or SIT(U.a|S▷◁T▷◁U), among others.

Figure 11:
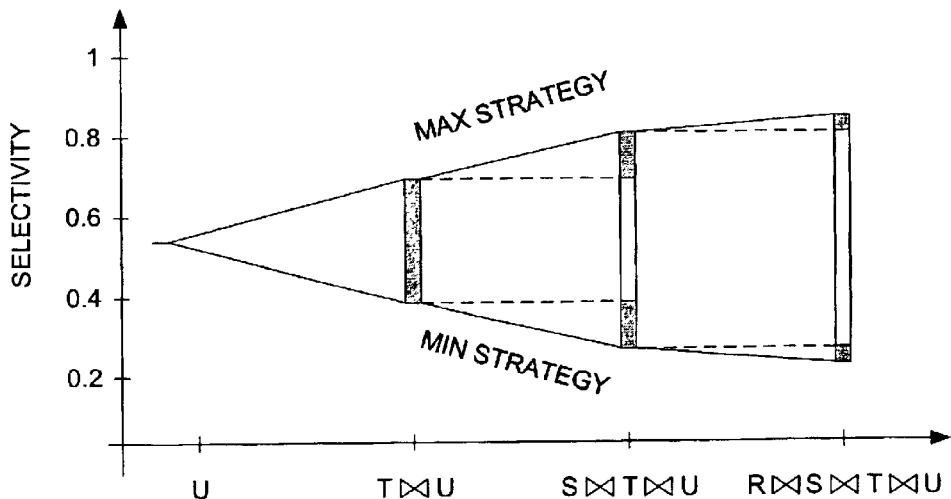
FIG. 11 is a graphical depiction of selectivity estimation according to an embodiment of the present invention.

For this purpose, the Min and Max extreme cardinality estimation strategies are exploited. Given the query $q=\sigma_{U.a<10}(R▷◁S▷◁T▷◁U)$, when the estimate of cardinality is performed using Min and Max strategies, the partial approximate cardinalities of the intermediate queries such as $\sigma_{U.a<10}(U), \sigma_{U.a<10}(T▷◁U)$, and $\sigma_{U.a<10}(S▷◁T▷◁U)$ are also automatically determined. Therefore, at no extra cost the cardinality of the pure join queries U, T▷◁U, R▷◁S▷◁T▷◁U can be obtained. By combining these cardinalities, the minimal and maximal partial selectivities of the join predicates are obtained as depicted in FIG. 11 (each point in the x-axis corresponds to a different join, assuming a fixed natural join order). For example, for the base table U, both the minimal and maximal estimated selectivities are 0.55, since they are taken from the base-table statistic for U.a. However, each join increments the possible range of selectivities, and consequently, the propagated estimation error. The estimated selectivity for the whole join ranges between 0.25 and 0.85. However, most of this range is inherited form the previous join S▷◁(T▷◁U). In effect, the last join does not introduce large variations in selectivity when using the Min and Max strategies.

In the described embodiment, the simplifying assumption is made that for a fixed attribute, the relative importance of a join query (and therefore the importance of a candidate SIT) is proportional to the increase of uncertainty of the selectivity estimation with respect to the previous join in the sequence. That is, if for some particular operator the minimal and maximal selectivity estimations change significantly, it is more likely that this particular operator has some correlation with the filter predicate for which building statistics is being considered. Under that assumption, the effect of building and exploiting SIT(U.a|R▷◁S▷◁T▷◁U) would be limited in FIG. 11. In contrast since T▷◁U substantially increases the range of possible selectivities for the query, SIT(U.a|T▷◁U) should be one of the first candidates to be built.

Given an input query $q=\sigma_{p1}\hat{}\ldots\hat{}_{pk}(R_1 \bowtie \ldots \bowtie R_n)$, and assuming that the predicate $p_i$ refers to attribute $a_i$ belonging in table $R_1$ and the join order that the Min and Max strategies consider is $R_1, \ldots, R_n$ the candidate SITs for $a_i$ are $SIT(a_i|R_1), \ldots, SIT(a_i|R_1 \bowtie \ldots \bowtie R_n)$. A score of $SIT(a_i|R_1 \bowtie \ldots \bowtie R_n)$ is defined as 0 if j=1 and $$(E^{ai}_{Max} - E^{ai}_{Min}) \cdot \frac{\Delta^{ai}_j - \Delta^{ai}_{j-1}}{\Delta^{ai}_n}$$

otherwise, where $E^{ai}_{Max}$ and $E^{ai}_{Min}$ are the estimated execution times for query q when using the Min (respectively, Max) strategy with respect to attribute $a_i$ and $\Delta^{ai}_j = SelMax^{ai}_j - SelMin^{ai}_j$ is the difference in selectivity of $\sigma_{p1}(R_1 \bowtie \ldots \bowtie R_j)$ when using the Max and Min strategies with respect to attribute $a_i$. The quantity $\Delta^{ai}_j - \Delta^{ai}_{j-1}/\Delta^{ai}_n$ varies from 0 to 1 and simply represents the fraction of selectivity, relative to the final selectivity range for the whole query, that is introduced by the j-th join (shaded regions in FIG. 11). It can be seen that the larger the score of a candidate SIT, the more likely that it makes a difference during query optimization.

To generalize the procedure to a workload that consists of several queries, a hash table of SITs is maintained. The partial score obtained from each query in the workload is added to the table for each SIT. Therefore, for a given workload W, the score $Score(SIT(a_i|Q))$ is defined as $\Sigma_{q \in W} Score_q(SIT(a_i|Q))$. After processing all queries, the top SITs are selected according to the Score value that fits in the available space. The following pseudocode summarizes these steps:

```
01  for each q in W and attribute a_i referenced in a filter
       condition p_i in query q
02      E_min, E_max = esimated cost for q using the Min, Max
           strategies with respect to a_I
03      Let R_1, ... R_n be the join order used by the extreme strategies
04      selMax_j^ai - selMin_j^ai = selectivity of predicate
           σ_p1(R_1▷ ◁ ...▷ ◁ R_j)
           using Min, Max w.r.t. a_i for j ∈ 1 ... n
```

```
05      for j = 2 to n
           Score[SIT(a_i | R_I ▷ ◁ ... ▷ ◁ R_n)] += (E^ai_Max - E^ai_Min) · (Δ^ai_j - Δ^ai_{j-1})/Δ^ai_n where Δ_j = SelMax_j^ai - selMin_j^ai
06      Select the top statistics SIT(a_i|J_k) that fit in the available space
```

This algorithm only predicts which statistics can be useful to the query optimizer. In practice, SITs with large scores can be false positives, i.e. the independence assumption might work fine. A post-processing step to discard SITs whose cardinality distributions are similar to those from which they were generated would be beneficial. A technique for such a post-processing step is described in detail in the '833 application. In those cases, the independence assumption used by traditional optimizers is accurate, and the resulting available space can be used to build more useful SITs.

It can be seen from the foregoing description that building and maintaining statistical information on intermediate query results can result in more efficient query plans. Although the present invention has been described with a degree of particularity, it is the intent that the invention include all modifications and alterations from the disclosed design falling within the spirit or scope of the appended claims.

We claim:

1. In a relational database having records stored therein and having a query optimizer that generates a query execution plan wherein each query plan comprises a plurality of intermediate query plan components that verify a subset of records from the database meeting query criteria, a method for evaluating a user query comprising the steps of:
    accessing the query plan and a set of stored intermediate statistics for records verified by query components of the query plan;
    selecting intermediate statistics and applying them to the query plan to form a transformed query plan; and
    estimating the cardinality of the transformed query plan.

2. The method of claim 1 wherein an intermediate statistic comprises a cardinality of the records verified by a given query component.

3. The method of claim 1 wherein an intermediate statistic is a histogram that describes the records verified by a given query component.

4. The method of claim 1 comprising the step of rewriting the query plan to incorporate intermediate statistics.

5. The method of claim 1 wherein the intermediate statistics are viewed as hypothetical base tables having statistics on a given attribute by the query optimizer.

6. The method of claim 1 wherein the step of selecting intermediate statistics is performed by selecting a set of intermediate statistics that minimizes a number of independence assumptions that will be made in evaluating the query plan according to the selected set.

7. The method of claim 1 wherein the step of selecting intermediate statistics is performed by:
    selecting an intermediate statistic that minimizes a number of independence assumptions that will be made in evaluating the query plan and adding the selected statistic to a set of selected statistics;
    selecting an intermediate statistic that, when applied in conjunction with the selected set minimizes a number of independence assumptions that will be made in evaluating the query plan and adding the selected statistic to the set of selected statistics; and continuing to select intermediate statistics for the set of selected statistics until no new intermediate statistic can be applied.

8. The method of claim 1 wherein the relational database has a workload comprising a set of queries that have been executed on the database and comprising the step of generating a pool of intermediate statistics to be stored for query plan evaluation based on the queries in the workload.

9. The method of claim 1 wherein at least one of the stored intermediate statistics is generated by approximating a result of a query component and computing statistics on the approximate result.

10. For use in a relational database having records stored therein and having a query optimizer that generates a query execution plan wherein each query plan comprises a plurality of intermediate query plan components that verify a subset of records from the database meeting query criteria, a computer-readable medium comprising computer executable instructions for performing a method for evaluating a user query comprising the steps of:

accessing the query plan and a set of stored intermediate statistics for records verified by query components of the query plan;

selecting intermediate statistics and applying them to the query plan to form a transformed query plan; and estimating the cardinality of the transformed query plan.

11. The computer-readable medium of claim 10 wherein the step of selecting intermediate statistics is performed by selecting a set of intermediate statistics that minimizes a number of independence assumptions that will be made in evaluating the query plan according to the selected set.

12. The computer-readable medium of claim 10 wherein the step of selecting intermediate statistics is performed by:

selecting an intermediate statistic that minimizes a number of independence assumptions that will be made in evaluating the query plan and adding the selected statistic to a set of selected statistics;

selecting an intermediate statistic that, when applied in conjunction with the selected set minimizes a number of independence assumptions that will be made in evaluating the query plan and adding the selected statistic to the set of selected statistics; and continuing to select intermediate statistics for the set of selected statistics until no new intermediate statistic can be applied.

13. The computer-readable medium of claim 10 wherein the relational database has a workload comprising a set of queries that have been executed on the database and comprising the step of generating a pool of intermediate statistics to be stored for query plan evaluation based on the queries in the workload.

14. For use in a relational database having records stored therein and having a query optimizer that generates a query execution plan wherein each query plan comprises a plurality of intermediate query plan components that verify a subset of records from the database meeting query criteria, an apparatus for evaluating a user query comprising:

a query plan access tool for accessing the query plan and a set of stored intermediate statistics for records verified by query components of the query plan;

an intermediate statistic selector for selecting intermediate statistics and applying them to the query plan to form a transformed query plan; and a cardinality estimator for estimating the cardinality of the transformed query plan.

15. The apparatus of claim 14 comprising a query plan rewriter that rewrites the query plan to incorporate intermediate statistics.

16. The apparatus of claim 14 wherein the intermediate statistic selector selects a set of intermediate statistics that minimizes a number of independence assumptions that will be made in evaluating the query plan according to the selected set.

17. The apparatus of claim 14 wherein the intermediate statistic selector selects intermediate statistics by:

selecting an intermediate statistic that minimizes a number of independence assumptions that will be made in evaluating the query plan and adding the selected statistic to a set of selected statistics;

selecting an intermediate statistic that, when applied in conjunction with the selected set minimizes a number of independence assumptions that will be made in evaluating the query plan and adding the selected statistic to the set of selected statistics; and continuing to select intermediate statistics for the set of selected statistics until no new intermediate statistic can be applied.

18. The apparatus of claim 14 wherein the relational database has a workload comprising a set of queries that have been executed on the database and wherein the apparatus comprises an intermediate statistic generator for generating a pool of intermediate statistics to be stored for query plan evaluation based on the queries in the workload.

19. For use in a relational database having records stored therein and having a query optimizer that generates a query execution plan wherein each query plan comprises a plurality of intermediate query plan components that verify a subset of records from the database meeting query criteria, an apparatus for evaluating a user query comprising:

means for accessing the query plan and a set of stored intermediate statistics for records verified by query components of the query plan;

means for selecting intermediate statistics and applying them to the query plan to form a transformed query plan; and means for estimating the cardinality of the transformed query plan.

20. The apparatus of claim 19 comprising a means for rewriting the query plan to incorporate intermediate statistics.

21. The apparatus of claim 19 wherein the means for selecting intermediate statistics selects a set of intermediate statistics that minimizes a number of independence assumptions that will be made in evaluating the query plan according to the selected set.

22. The apparatus of claim 19 wherein the means for selecting intermediate statistics selects intermediate statistics by:

selecting an intermediate statistic that minimizes a number of independence assumptions that will be made in evaluating the query plan and adding the selected statistic to a set of selected statistics;

selecting an intermediate statistic that, when applied in conjunction with the selected set minimizes a number of independence assumptions that will be made in evaluating the query plan and adding the selected statistic to the set of selected statistics; and continuing to select intermediate statistics for the set of selected statistics until no new intermediate statistic can be applied.

23. The apparatus of claim 19 wherein the relational database has a workload comprising a set of queries that have been executed on the database and wherein the apparatus comprises a means for generating a pool of intermediate statistics to be stored for query plan evaluation based on the queries in the workload.

* * * * *

UNITED STATES PATENT AND TRADEMARK OFFICE
CERTIFICATE OF CORRECTION

PATENT NO. : 6,947,927 B2
APPLICATION NO.: 10/191822
DATED : September 20, 2005
INVENTOR(S) : Chaudhuri et al.

It is certified that error appears in the above-identified patent and that said Letters Patent is hereby corrected as shown below:

On the title page, item (73), in "Assignee", in column 1, line 1, delete "VA" and insert -- WA --, therefor.

On page 2, item (56), under "Other Publications", in column 2, line 6, delete "Conneli" and insert -- Connell --, therefor.

In column 1, line 49, delete "memoization" and insert -- memorization --, therefor.

In column 2, line 4, delete "reasons" and insert -- reason --, therefor.

In column 2, line 14, delete "$f_t$" and insert -- $f_i$ --, therefor.

In column 2, line 15, delete "$f_t$" and insert -- $f_i$ --, therefor.

In column 2, line 21, delete "$f_t/dv_i$" and insert -- $f_i/dv_i$ --, therefor.

In column 2, line 22, delete "$\delta_i = f_t/dv_i$" and insert -- $\delta_i = f_i/dv_i$ --, therefor.

In column 3, line 49, delete "$\sigma_{S\ a<10}(R \triangleright \triangleleft S)$" and insert -- $\sigma_{S.a<10}(R \triangleright \triangleleft S)$ --, therefor.

In column 3, line 51, delete "$\sigma_{S\ a<10}(S)$" and insert -- $\sigma_{S.a<10}(S)$ --, therefor.

In column 3, line 55, delete "$R \triangleright \triangleleft (\sigma_{S\ a<10}(S))$" and insert -- $R \triangleright \triangleleft (\sigma_{S.a<10}(S))$ --, therefor.

In column 3, line 57, delete "$R \triangleright \triangleleft (\sigma_{S\ a<10}(S)) \equiv \sigma_{Sa<10}(R \triangleright \triangleleft S)$" and insert -- $R \triangleright \triangleleft (\sigma_{S.a<10}(S)) \equiv \sigma_{S.a<10}(R \triangleright \triangleleft S)$ --, therefor.

In column 8, line 16, delete "described" and insert -- describe --, therefor.

In column 10, line 18, delete "compatilble" and insert -- compatible --, therefor.

In column 11, line (s) 12-13, delete "orders$\triangleright$ $\triangleleft$lineitem" and insert -- orders$\triangleright$ $\triangleleft$lineitem --, therefor.

UNITED STATES PATENT AND TRADEMARK OFFICE
CERTIFICATE OF CORRECTION

PATENT NO. : 6,947,927 B2  Page 2 of 2
APPLICATION NO.: 10/191822
DATED : September 20, 2005
INVENTOR(S) : Chaudhuri et al.

It is certified that error appears in the above-identified patent and that said Letters Patent is hereby corrected as shown below:

In column 11, line 61, delete "Analsysis" and insert -- Analysis --, therefor.

In column 12, line 21, delete "an" and insert -- and --, therefor.

In column 13, line(s) 64-65, delete "$\sigma_{U\ a<10}, N_1$" and insert -- $\sigma_{U,a<10}, N_1$ --, therefor.

In column 14, line 12, delete "$a_1, \ldots, a_k$" and insert -- $a_i, \ldots, a_k$ --, therefor.

In column 14, line 20, delete "$a_1,$" and insert -- $a_i,$ --, therefor.

In column 14, line 21, delete "$s_1$" and insert -- $s_i$ --, therefor.

In column 14, line 21, delete "$\sigma p_1$" and insert -- $\sigma p_i$ --, therefor.

In column 14, line 24, delete "$C.\Pi_i s_1$" and insert -- $C.\Pi_i s_i$ --, therefor.

In column 15, line 40, delete "$\sigma p_1$" and insert -- $\sigma p_i$ --, therefor.

In column 15, line 62, delete "esimated" and insert -- estimated --, therefor.

In column 15, line 65, delete "$\sigma p_1$" and insert -- $\sigma p_i$ --, therefor.

Signed and Sealed this

Twenty-fourth Day of November, 2009

David J. Kappos
*Director of the United States Patent and Trademark Office*